United States Patent

Hoshina

Patent Number: 5,230,056
Date of Patent: Jul. 20, 1993

[54] BATTERY POWERED INFORMATION TERMINAL APPARATUS WHEREIN THE CLOCK FREQUENCY IS SWITCHED DEPENDENT UPON THE BATTERY VOLTAGE

[75] Inventor: Masahiro Hoshina, Yokohama, Japan

[73] Assignee: Matsushita Electric Industrial Co., Ltd., Osaka, Japan

[21] Appl. No.: 740,959

[22] Filed: Aug. 6, 1991

[30] Foreign Application Priority Data

Aug. 13, 1990 [JP] Japan .................. 2-213955

[51] Int. Cl.$^5$ .................. G06F 1/32; G06F 1/30
[52] U.S. Cl. .................. 395/750; 364/707; 364/273.1; 364/DIG. 1
[58] Field of Search .................. 395/750; 364/707, 184, 364/185; 307/66; 340/636, 661, 663; 365/226, 227; 371/4, 5.5; 361/90

[56] References Cited

U.S. PATENT DOCUMENTS

| | | | |
|---|---|---|---|
| 4,234,920 | 11/1980 | Van Ness et al. | 364/200 |
| 4,317,180 | 2/1982 | Lies | 364/707 |
| 4,365,290 | 12/1982 | Nelms et al. | 364/200 |
| 4,461,003 | 7/1984 | Tamaki | 371/66 |
| 4,611,289 | 9/1986 | Coppola | 364/492 |
| 4,803,459 | 2/1989 | Ta | 340/52 R |
| 4,827,111 | 5/1989 | Kondo | 235/380 |
| 4,843,592 | 6/1989 | Tsuaki et al. | 364/900 |
| 4,907,183 | 3/1990 | Tanaka | 364/707 |

Primary Examiner—Michael R. Fleming
Assistant Examiner—Gopal C. Ray
Attorney, Agent, or Firm—Stevens, Davis, Miller & Mosher

[57] ABSTRACT

An information terminal apparatus has a capability of continuously operating, when a battery capacity drop is detected, and maintaining the battery capacity at a certain level for an extended period. When the battery capacity drops to cause a battery voltage generating circuit to generate a warning signal, a clock frequency switching circuit switches a clock signal from a normal frequency to a lower frequency, whereby the apparatus operates at a speed slower than before and accordingly consumes less current, so that even if the apparatus keeps operating, a time period available until it eventually stops can be prolonged. Therefore, a user can definitely recognize deterioration of the performance of the apparatus or slow-down of the operating speed due to a battery capacity drop. Also, since a time period available until the apparatus stops is longer, countermeasures such as exchanging or recharging the battery can be readily taken before the battery is completely used up.

1 Claim, 1 Drawing Sheet

BATTERY POWERED INFORMATION TERMINAL APPARATUS WHEREIN THE CLOCK FREQUENCY IS SWITCHED DEPENDENT UPON THE BATTERY VOLTAGE

BACKGROUND OF THE INVENTION

This invention relates to an information terminal apparatus controlled by a microprocessor which is operated by a battery employed as an electric power source thereof.

Conventionally, this type of information terminal apparatus is provided with a battery voltage detecting circuit so as to prevent the microcomputer from malfunctioning due to a drop of battery voltage, when the battery capacity is lowering, and is constructed to stop the operation when a battery voltage drop is detected by the detecting circuit.

Also, for solving an inconvenience that a voltage drop causes a sudden stoppage of the apparatus, the information terminal apparatus is provided with a circuit for detecting a drop of battery capacity at a time when a bit of voltage capacity still remains so as to display such a battery capacity drop on a display unit or the like for warning. The conventional information terminal apparatus can also solve the inconvenience of a sudden stoppage thereof by coping with a battery capacity drop in two different manners, i.e., displaying a warning and stopping the apparatus.

However, when the information terminal apparatus as mentioned above is being used for communications, there may be a case where the communication is desired to be continued, even if the display for warning a battery capacity drop is disregarded, because of emergency or high importance of the communication. In such a case, however, the communication may be eventually interrupted by a stoppage of the information terminal apparatus. When the apparatus once stops, it is necessary to exchange or recharge a battery. If the battery has been completely discharged, an initial discharge characteristic may not be obtained even with the recharged battery.

SUMMARY OF THE INVENTION

The present invention has been made to solve the conventional problem as described above, and its object is to provide an improved information terminal apparatus which is capable of continuously operating, after a warning is displayed for indicating a battery capacity drop, and maintaining the battery capacity at a certain level for a while.

To achieve the above object, the information terminal apparatus according to the present invention is provided with a circuit for detecting a battery capacity and a clock frequency switching circuit for switching a main clock of a microprocessor to thereby slow down the clock frequency in response to a detecting signal indicative of a battery capacity drop.

The information terminal apparatus of the invention, constructed as described above, operates in the following manner. When the battery capacity drops to cause the battery voltage generating circuit to generate a warning signal, the clock frequency switching circuit switches a clock signal from a normal frequency to a lower frequency, whereby the apparatus operates at a speed slower than before and accordingly consumes less current. Therefore, even if the apparatus keeps operating, a time period available until it eventually stops can be prolonged.

DESCRIPTION OF THE PREFERRED EMBODIMENT

Figure 1:
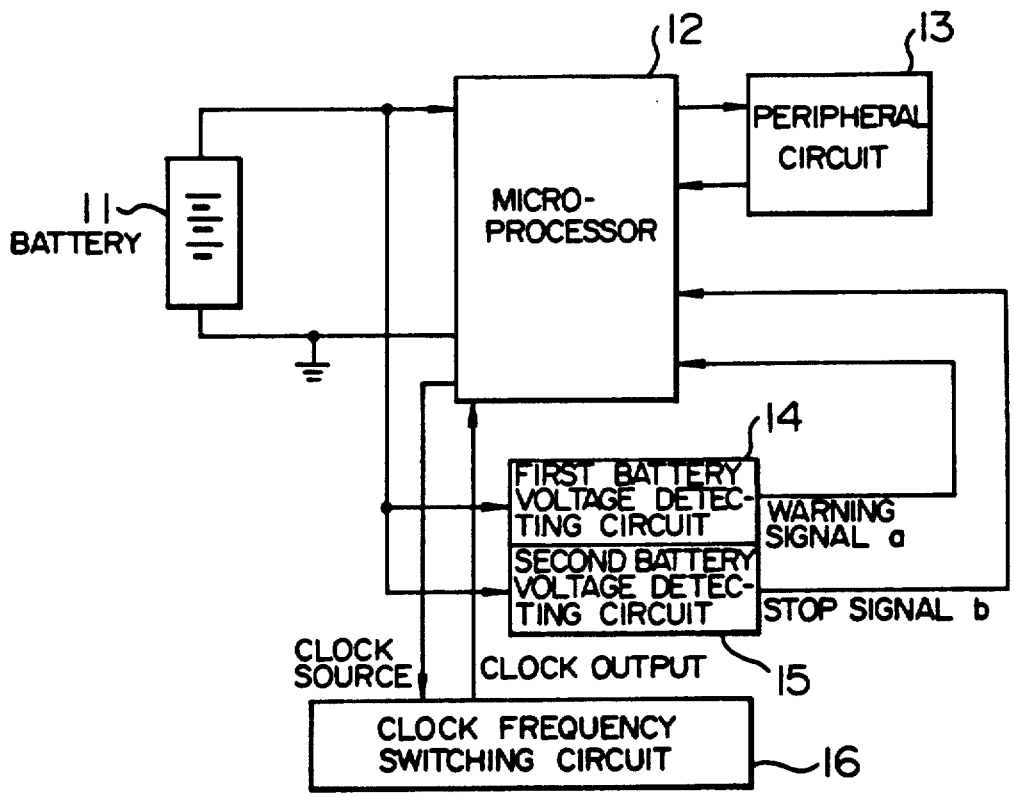
FIG. 1 is a block diagram illustrating an information terminal apparatus controlled by a microprocessor driven by a battery according to an embodiment of the present invention.

FIG. 1 shows the configuration of an embodiment of the present invention. In FIG. 1, reference numeral 11 designates a battery which serves as a main power source for a microprocessor 12 and associated peripheral circuits 13 including a display unit. Reference numeral 14 designates a first battery voltage detecting circuit and 15 a second battery voltage detecting circuit. The first battery voltage detecting circuit 14 is adapted to detect a voltage detecting threshold value V1 to output a warning signal a, while the second battery voltage detecting circuit 15 detect a voltage detecting threshold value V2 to output a stop signal b. Reference numeral 16 designates a clock frequency switching circuit for switching the main clock of the microprocessor 12.

Figure 2:
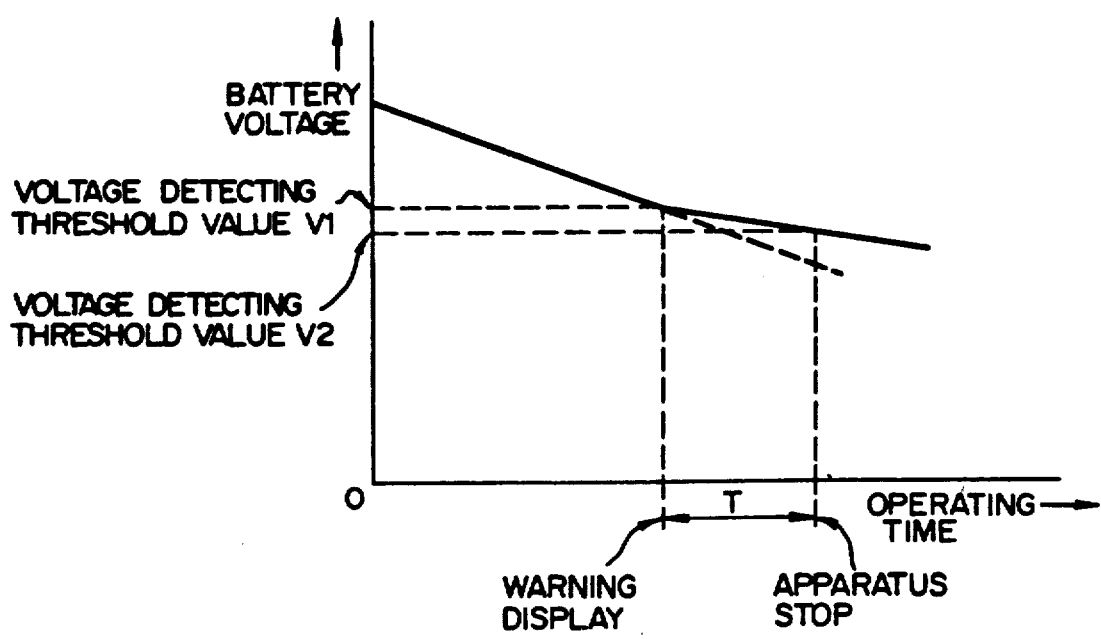
FIG. 2 is a graph showing the operation of the apparatus.

Next, the operation of the above-mentioned embodiment will be described with reference to FIG. 2. Supposing that the voltage of the battery 11 drops to the voltage detecting threshold value V1, the first battery voltage detecting circuit 14 generates the warning signal a. The microprocessor 12, responsive to this warning signal a, commands the display unit included in the peripheral circuit 13 to display a warning. Simultaneously, the clock frequency switching circuit 16, also responsive to the warning signal a, switches the clock at a normal frequency to that at a half frequency and supplies the same to the microprocessor 12, which results in slowing down the operating speed of the microprocessor 12 by half. The decrease in the clock frequency also results in reducing the current consumed by the apparatus and accordingly lowers the ratio of battery 11 consumption per hour, which leads to prolonging a time period T from a time at which the warning display signal a is outputted to a time at which the second battery voltage detecting circuit 15 detects the voltage detecting threshold value V2 and outputs the stop signal b. As a result, a time margin is available from the display for warning a battery capacity drop to a stoppage of the apparatus.

As is apparent from the above description of the embodiment, when the battery capacity drops, a warning is displayed as well as the operating speed of the apparatus slows down to thereby provide a longer time margin available until the apparatus stops due to shortage of the power supply than conventional apparatus, which allows a user to definitely recognize deterioration of the performance of the apparatus or slow-down of the operating speed caused by a battery capacity drop. Also, since a time period available until the apparatus stops is longer, countermeasures such as exchanging or recharging the battery can be readily taken before the battery is completely used up.

I claim:

1. An information terminal apparatus, comprising:
   a CPU;

at least one peripheral device;

a battery supplying voltage to said CPU and said at least one peripheral device;

a first battery voltage detecting circuit for detecting a voltage level of said battery and outputting a warning signal to said CPU when said voltage level is less than a first threshold;

a second battery voltage detecting circuit for detecting a voltage level of said battery and outputting a halt signal to said CPU when said voltage level is less than a second threshold, whereby operations of said CPU and said at least one peripheral device are halted in response to said halt signal; and a clock frequency switching circuit, operatively associated with said CPU, for supplying a high frequency clock signal to said CPU when said warning signal is not being outputted, and switching said CPU to a lower frequency clock signal when said warning signal is being outputted.

* * * * *